May 2, 1950 J. L. RENNICK 2,505,791

INDUCTANCE TUNING APPARATUS

Filed Feb. 27, 1946

JOHN L. RENNICK
INVENTOR.

BY David M. Davis
Frank E. Mauritz
HIS ATTORNEYS

Patented May 2, 1950

2,505,791

UNITED STATES PATENT OFFICE 2,505,791

INDUCTANCE TUNING APPARATUS

John L. Rennick, Elmwood Park, Ill., assignor to Zenith Radio Corporation, a corporation of Illinois Application February 27, 1946, Serial No. 650,706

3 Claims. (Cl. 250—40)

The present invention pertains in general to variable inductance tuning systems for radio receivers and in particular to such systems wherein a movable member is associated with a tuning coil to vary the inductance thereof.

In the past such systems have employed trimmer condensers as part of the tuning circuits to compensate for manufacturing variations in the circuit elements. There are a number of considerations which indicate that it would be desirable to eliminate the need for such trimmer condensers, among which may be mentioned the added stray capacity introduced by the trimmers, instability due to undesired variations in the capacity of the trimmers, and the necessity for locating the trimmers in a position where they are readily accessible for adjustment purposes.

The principal object of the present invention is to provide an improved variable inductance tuning system wherein the need for such a trimmer condenser is eliminated. It is a non-specific object to arrange such a system in which a coil is wound so as to permit compensation for manufacturing variations through variation of the initial setting of the movable member.

A further object of the invention is to provide a tuning system wherein the stray capacity is reduced to a minimum.

Another object of the invention is to improve the stability of inductance tuning systems.

Figures 1, 2, 3, 4:
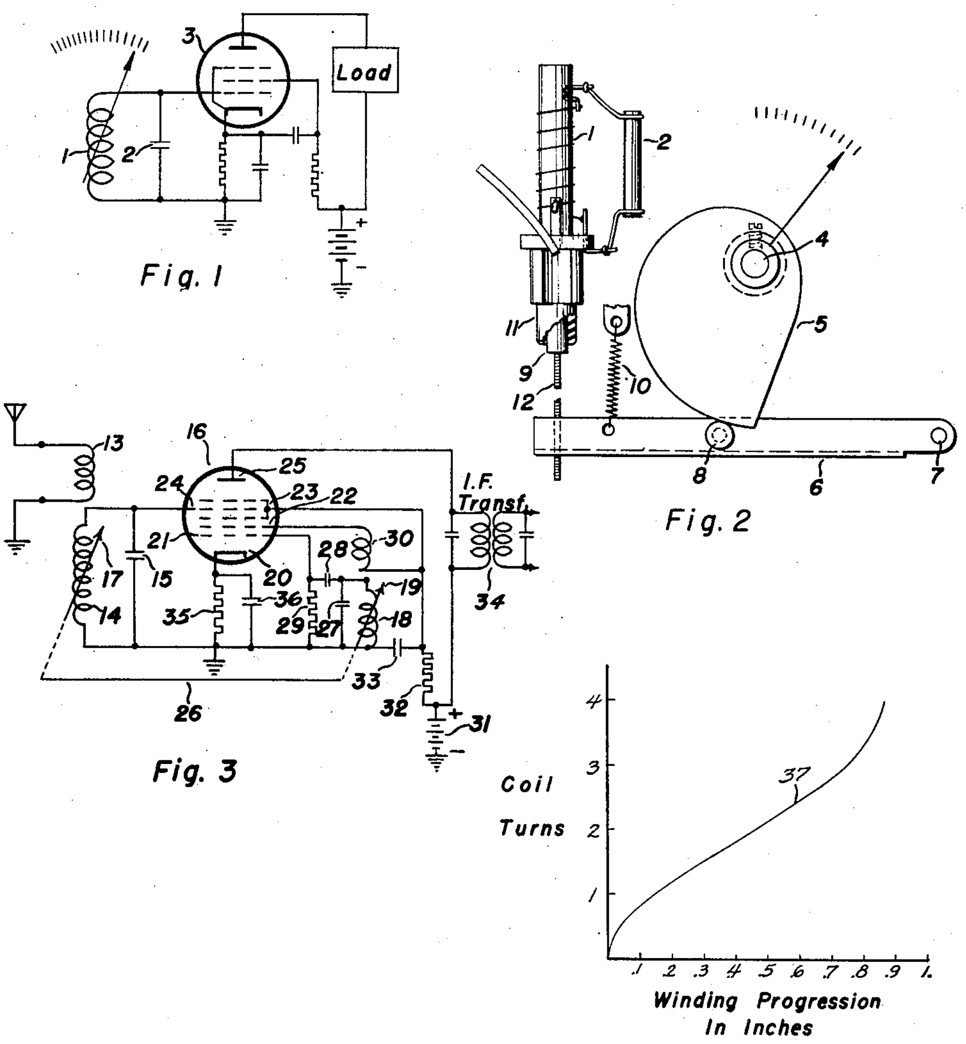
Figure 5:
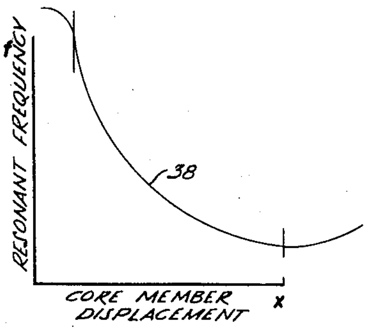

The features of the invention which are believed to be novel are set forth with particularity in the appended claims. The present invention itself, both as to its organization and manner of operation, together with further objects and advantages thereof, may best be understood by reference to the following description taken in connection with the accompanying drawing, in which;

Figure 1 is a schematic diagram of a radio frequency stage of a radio receiver incorporating inductance tuning, Figure 2 illustrates the mechanical construction of the tuning elements, Figure 3 is a schematic diagram of a superheterodyne type radio receiver incorporating inductance tuning, Figure 4 is a graph illustrating the manner in which the inductance should be wound in order to obtain the desired characteristics, and Figure 5 is a graph showing the relationship which must exist between the frequency to which the tuning circuit is resonant and the position of the movable member associated with the variable inductance.

Described briefly, the embodiment of the invention illustrated herein comprises an inductance coil which is wound so as to result in a logarithmic relation between the position of a movable magnetic member associated with the inductance and the resonant frequency of a tuned circuit incorporating the inductance, whereby variations in the capacity of the tuned circuit can be compensated for by variation of the initial position of the movable member without altering the relation between a movable tuning control and the resonant frequency of the tuned circuit.

In Figure 1 there is shown a variable inductance 1 across which is connected a fixed condenser 2, both of which are included in the input circuit of an amplifier tube 3. The tuned circuit including coil 1 and condenser 2 may be coupled to a receiving antenna, or may be coupled to a preceding radio frequency amplifier stage. A maximum signal voltage will be impressed on the input of tube 3 for signal frequencies near the resonant frequency of the tuned circuit. Tube 3 operates in the usual manner to deliver an amplified reproduction of the selected signals to the load, which may be the input circuit of a suceeding amplifier tube.

In Figure 2 there is shown a tuning shaft 4 to which a cam 5 is secured. A tuning control member, or lever, 6 is pivoted on pin 7 and is biased in a clockwise direction by a helical spring 10. The clockwise movement of lever 6 is limited by a roller 8 rotatably secured thereto and engaging the cam 5, whereby the position of lever 6 is governed by the setting of the tuning shaft 4 in accordance with the shape of cam 5. A member, in the form of a cylindrical slug 9, which is preferably molded from powdered iron and a suitable binder, is slidably secured within a molded phenolic coil form 11. A conductive metal, such as copper, may be used to advantage for member 9 at frequencies above those at which iron losses are relatively high, but at lower frequencies iron is preferable when a large change in inductance is required. The invention is particularly useful when iron is employed to provide a wide tuning range as alignment and tracking requirements are then more severe than they are when only a narrow tuning range is provided. The member 9 is adjustably secured to the lever 6 by means of a threaded rod 12. The coil 1 is wound about the upper portion of the form 11. Fixed condenser 2 is connected across the extremities of coil 1. As lever 6 is moved by rotation of the tuning shaft 4, the member 9 moves in a vertical direction within the coil 1 to change the inductance thereof.

When the member 9 is entirely within the coil 1 the resonant frequency of the tuned circuit changes but slightly with movement of the member 9. Also when the member is entirely outside of the coil 1 the resonant frequency changes but slightly with the position thereof. Intermediate these two extremes the relationship between the resonant frequency of the tuned circuit and the position of the member is complex if the turns of coil 1 are uniformly spaced. However, when the turns of the coil 1 are distributed in accordance with the curve 37 shown in Figure 4, a logarithmic relation between the resonant frequency of the tuned circuit and the position of the member can be obtained over the desired range of frequencies. The shape of the curve 37 shown in Figure 4 will, of course, vary with the dimensions of the member and the coil employed. It may be noted that the slope of this curve is equal to the winding pitch which is a maximum at the start and finish of the winding and is nearly constant in the center of the winding. When the turns of the inductance coil 1 are distributed in accordance with the curve 37 of Figure 4, the relationship between the displacement of the core member 9 within this coil and the resonant frequency of the tuned circuit is as shown by the curve 38 of Figure 5.

Let $x$ represent the displacement of the member 9, shown in Figure 2, and let L be the inductance of coil 1. The required relation between inductance and position of the magnetic member may then be represented by the equation $$x=A+B\log L \qquad (1)$$

wherein A and B are constants depending on the dimensions of the system. It will now be demonstrated that when the above relation exists the initial setting of the member 9 may be varied to compensate for variations in the capacity of the tuned circuit.

It is well known that $$f=\frac{1}{2\pi\sqrt{LC}} \qquad (2)$$

wherein $f$ is the resonant frequency, and L and C represent the inductance and capacity, respectively, of a tuned circuit. Equation 2 may be written in the form $$L=\frac{1}{4\pi^2 f^2 C} \qquad (3)$$

Substituting Equation 3 in Equation 1, $$X=A+B\log\frac{1}{4\pi^2 f^2 C} \qquad (4)$$

$$=A-B\,(\log 4\pi^2+2\log f+\log C) \qquad (5)$$

We may now let $$x=d+E \qquad (6)$$

wherein $d$ is the displacement of the tuning control member, or lever, 6 and E is the variation from the nominal value of the distance between member 9 and lever 6.

Substituting Equation 6 in Equation 5

$$d=A-B\log 4\pi^2-2B\log f-(B\log C+E) \qquad (7)$$

$$=A'-2B\log f-(B\log C+E) \qquad (8)$$

It is evident from the latter equation that any variation in the value of C may be exactly compensated for by a change in the value of E, which represents a variation in the initial setting of the member 9, without affecting the desired relation between the resonant frequency $f$ of the tuned circuit and the displacement $d$ of the tuning member. Thus, in the alignment of a radio receiver incorporating the invention, the setting of the member 9 relative to a movable tuning member, such as lever 6, is initially varied to make the tuning circuit including coil 1 and condenser 2 resonant at the desired frequency for a particular position of the movable tuning member. Once the initial adjustment of the member 9 has been accomplished, a very stable relationship is maintained between the resonant frequency of the tuning circuit and the movement of lever 6. This increased stability may be taken advantage of by decreasing the value of, or eliminating, the fixed condenser 2 and increasing the number of turns on coil 1. The input capacity of amplifier tube 3, stray wiring capacity, and the distributed capacity of coil 1 serve to tune the circuit when condenser 2 is eliminated. When the number of turns of coil 1 is increased, a higher ratio of inductive reactance to resistance, or Q, will usually be obtained as the inductance is approximately proportional to the square of the number of turns while the resistance is directly proportional to the number of turns. The increased Q of the tuned circuit results in greater selectivity. When trimmer condensers are employed it is impractical to greatly reduce the value of, or to eliminate, the fixed condenser 2 because the undesired variations in capacity of the trimmer would affect the tuning of the circuit to an unreasonable extent.

While the invention has been described in connection with a single radio frequency amplifier stage it should be appreciated that normally a number of stages similar to that shown in Figure 1 are connected in cascade, the inductance of all of the coils, such as 1, being varied simultaneously by movement of members, such as 9, individually associated therewith under the control of the common tuning member 6.

In Figure 3 the invention has been illustrated as applied to the converter portion of a superheterodyne type of radio receiver. This converter circuit is novel in that the signal receiving and oscillator circuits are tuned by variable inductances which are constructed in accordance with the invention to enable alignment and tracking adjustments to be greatly simplified. The primary winding 13 of an input transformer is connected between the antenna and ground terminals of the receiver. The secondary winding 14 of the input transformer is connected between control grid 24 and cathode 20 of a pentagrid converter tube 16 in parallel with a fixed condenser 15. The inductance of winding 14 is varied by movement of a member 17 associated therewith at the same time that the inductance of a winding 18 is varied by movement of a similar member 19. Each of these windings is wound with a progressively varying winding pitch, as illustrated in Figure 2, so as to cause the inductance thereof to bear a substantially logarithmic relation to the displacement of the associated member. The members 17 and 19 are each adjustably coupled to a common tuning member 26. Winding 18 is connected, in parallel with a fixed condenser 27, between oscillator grid 21 and cathode 20 of tube 16 in series with condenser 28. A grid leak resistor 29 is connected between grid 21 and ground. A feedback winding 30, which is coupled to winding 18, is connected between oscillator anode grid 22 and the positive terminal of a source of potential 31 in series with resistor 32. A condenser 33 is connected between one terminal of resistor 32 and ground. Resistor 32 and condenser 33 constitute a low pass filter which serves to isolate the oscillator section of tube 16 from the other circuits in order to avoid undesired coupling through the common source of potential 31. The anode 25 of tube 16 is connected to the positive terminal of the source 31 in series with the primary winding of an intermediate frequency transformer 34. A cathode bias resistor 35 is connected between cathode 20 and ground in parallel with a condenser 36. The intermediate frequency amplifier, detector, and audio amplifier circuits have not been shown as they may be any conventional design.

The values of the condensers 15 and 27 and the constants of the windings 17 and 18 are chosen so as to make the oscillator frequency greater than the signal frequency by an amount equal to the desired intermediate frequency for all positions of the common tuning member 26. When the capacity of condenser 15 varies from its nominal value the initial position of the member 17 is varied to obtain the desired relation between the resonant frequency of the tuned circuit including winding 17 and condenser 15 and the position of the tuning member 26. Variations in the capacity of condenser 27 from its nominal value are compensated for by adjusting the initial position of member 19. The latter adjustment is not perfect, as it is for the R. F. stages, but is sufficiently precise for all practical purposes. By this method of aligning the R. F. and oscillator circuits only a single adjustment is required for each tuned circuit.

While a preferred form of the invention has been illustrated, it is to be understood that numerous modifications may be made therein without departing from the true spirit and scope of the invention as defined in the accompanying claims.

I claim:

1. In a radio receiver which is tunable over a band of frequencies, a tuning circuit including: a helically wound coil having a winding pitch that varies progressively along the length of the helix formed by said coil; a core member movable within the field of said coil to vary the resonant frequency of said tuning circuit, said coil and said core member being so shaped and related as to cause the resonant frequency of the circuit to bear a logarithmic relation to the displacement of said core member; a tuning control member; and a further member for adjustably coupling said core member to said tuning control member to compensate for variations in capacity of said circuit without effecting a desired relation between the resonant frequency of said circuit and the displacement of said tuning control member.

2. In a radio receiver which is tunable over a band of frequencies, a tuning circuit including: a winding; a core member movable with respect to said winding to vary the resonant frequency of said circuit, said winding and said core member being so shaped and related as to cause the resonant frequency of the circuit to bear a logarithmic relation to the displacement of said core member; a tuning control member; and a further member for adjustably coupling said core member to said tuning control member to compensate for variations in capacity of said circuit without effecting a desired relation between the resonant frequency of said circuit and the displacement of said tuning control member.

3. A frequency selective circuit including: a helically wound coil having a winding pitch that varies progressively along the length of the helix formed by said coil; a core member movable along the axis of said helix to vary the resonant frequency of said circuit, said winding pitch being such that the resonant frequency of said circuit bears a logarithmic relation to the displacement of said member; a tuning control member; and a further member for adjustably coupling said core member to said tuning control member to compensate for variations in capacity of said circuit without effecting a desired relation between the resonant frequency of said circuit and the displacement of said tuning control member.

JOHN L. RENNICK.

REFERENCES CITED

The following references are of record in the file of this patent:

UNITED STATES PATENTS

| Number | Name | Date |
|---|---|---|
| 2,144,353 | Weis | Jan. 17, 1939 |
| 2,338,134 | Sands, et al. | Jan. 4, 1944 |
| 2,363,101 | Van Der Heem | Nov. 21, 1944 |
| 2,375,911 | Foster | May 15, 1945 |
| 2,383,463 | Benin | Aug. 28, 1945 |
| 2,390,009 | Stott | Nov. 27, 1945 |
| 2,417,182 | Sands | Mar. 11, 1947 |